United States Patent [19]
Chua et al.

[11] Patent Number: 5,638,467
[45] Date of Patent: Jun. 10, 1997

[54] BIT-REVERSING METHOD AND SYSTEM FOR LINEAR IMAGE SCALING

[75] Inventors: Well-Chen Chua; Lie-Der Lin, both of Taipei; Shih-Pao Sun, Tainan; Cheun-Song Lin, Taichung, all of Taiwan

[73] Assignee: Industrial Technology Research Institute, Hsinchu, Taiwan

[21] Appl. No.: 62,410

[22] Filed: May 14, 1993

[51] Int. Cl.$^6$ ..................................... G06K 9/32
[52] U.S. Cl. ........................................ 382/298; 348/441
[58] Field of Search ........................... 382/47, 44, 56, 382/54, 293, 298, 299, 232, 254; 348/441, 443, 458, 459; 358/451; 345/127, 129; 395/139

[56] References Cited

U.S. PATENT DOCUMENTS

| | | | |
|---|---|---|---|
| 4,907,171 | 3/1990 | Nagashima | 382/47 |
| 5,007,001 | 4/1991 | Lloyd-Williams | 382/56 |
| 5,025,315 | 6/1991 | Johary et al. | 348/441 |

*Primary Examiner*—Leo Boudreau
*Assistant Examiner*—Phouc Tran
*Attorney, Agent, or Firm*—Meltzer, Lippe, Goldstein, et al.

[57] ABSTRACT

A bit-reversing method and system are disclosed for linearly scaling an image frame horizontally, vertically or both. The system includes a counter circuit for outputting the current frame-column number of the currently scanned pixel and the current frame-row number of the currently scanned frame-row. The numbers are bit reversed in a converter circuit. The bit-reversed current frame-column number is compared in a comparator circuit to a horizontal scaling constant which equals the number of pixels to be discarded in each frame-row of the image frame. The bit-reversed current frame-row number is compared in the comparator circuit to a vertical scaling constant which equals the number of frame-rows of the image frame to be discarded. If the bit-reversed current frame-row number is greater than the vertical scaling constant then the comparator circuit outputs appropriate signals to a scaling controller and an address generator for storing the currently scanned frame-row in a frame buffer. Otherwise, the comparator circuit outputs appropriate signals for discarding the currently scanned frame-row. Likewise, if the bit-reversed current column number is greater than the horizontal scaling constant, the comparator circuit outputs appropriate signals to the scaling controller and address generator for storing the currently scanned pixel in the frame buffer. Otherwise, the comparator circuit outputs appropriate signals for discarding the currently scanned pixel.

8 Claims, 12 Drawing Sheets

FIG. 3
(PRIOR ART)

SCALING FACTOR I=5/6

| INITIAL FRAME-COLUMN | DISCARD OR RETAIN? | NEW FRAME-COLUMN |
|---|---|---|
| 0 | RETAIN | 0 |
| 1 | RETAIN | 1 |
| 2 | RETAIN | 2 |
| 3 | RETAIN | 3 |
| 4 | RETAIN | 4 |
| 5 | DISCARD | |
| 6 | RETAIN | 5 |
| 7 | RETAIN | 6 |
| 8 | RETAIN | 7 |
| 9 | RETAIN | 8 |
| 10 | RETAIN | 9 |
| 11 | DISCARD | |
| 12 | RETAIN | 10 |
| 13 | RETAIN | 11 |
| 14 | RETAIN | 12 |
| 15 | RETAIN | 13 |

FIG. 4
(PRIOR ART)

SCALING FACTOR J = 1/2

| INITIAL FRAME-ROW | DISCARD OR RETAIN? | NEW FRAME-ROW |
|---|---|---|
| 0  | RETAIN  | 0 |
| 1  | DISCARD |   |
| 2  | RETAIN  | 1 |
| 3  | DISCARD |   |
| 4  | RETAIN  | 2 |
| 5  | DISCARD |   |
| 6  | RETAIN  | 3 |
| 7  | DISCARD |   |
| 8  | RETAIN  | 4 |
| 9  | DISCARD |   |
| 10 | RETAIN  | 5 |
| 11 | DISCARD |   |
| 12 | RETAIN  | 6 |
| 13 | DISCARD |   |
| 14 | RETAIN  | 7 |
| 15 | DISCARD |   |

FIG. 5
(PRIOR ART)

SCALING FACTOR J = 1/2

| | INITIAL FRAME-ROWS | DISCARD OR RETAIN? | DISPLAYED FRAME-ROWS | NEW FRAME-ROW |
|---|---|---|---|---|
| EVEN FIELD | 0 | RETAIN | ✓ | 0 |
| | 2 | DISCARD | | |
| | 4 | RETAIN | ✓ | 2 |
| | 6 | DISCARD | | |
| | 8 | RETAIN | ✓ | 4 |
| | 10 | DISCARD | | |
| | 12 | RETAIN | ✓ | 6 |
| | 14 | DISCARD | | |
| ODD FIELD | 1 | RETAIN | ✓ | 1 |
| | 3 | DISCARD | | |
| | 5 | RETAIN | ✓ | 3 |
| | 7 | DISCARD | | |
| | 9 | RETAIN | ✓ | 5 |
| | 11 | DISCARD | | |
| | 13 | RETAIN | ✓ | 7 |
| | 15 | DISCARD | | |

FIG. 7
(PRIOR ART)

SCALE FACTOR = 5/6

| | HSYNC PULSE FOR FRAME-ROW | FRAME-ROWS EXAMINED | STORED AT ROW ADDRESS | MODULO N COUNTER | FF4 INDICATION | FF5 INDICATION |
|---|---|---|---|---|---|---|
| EVEN FIELD | 0 | 0 | 0 | 0 | RETAIN | |
| | | 1 | | 1 | | RETAIN |
| | 2 | 2 | 2 | 2 | RETAIN | |
| | | 3 | | 3 | | RETAIN |
| | 4 | 4 | 4 | 4 | RETAIN | |
| | | 5 | | X | | DISCARD |
| | 6 | 6 | 5 | 0 | RETAIN | |
| | | 7 | | 1 | | RETAIN |
| | 8 | 8 | 7 | 2 | RETAIN | |
| | | 9 | | 3 | | RETAIN |
| | 10 | 10 | 9 | 4 | RETAIN | |
| | | 11 | | X | | DISCARD |
| | 12 | 12 | 10 | 0 | RETAIN | |
| | | 13 | | 1 | | RETAIN |
| | 14 | 14 | 12 | 2 | RETAIN | |
| | | 15 | | 3 | | RETAIN |
| ODD FIELD | 1 | 1 | 1 | 1 | RETAIN | |
| | | 2 | | 2 | | RETAIN |
| | 3 | 3 | 3 | 3 | RETAIN | |
| | | 4 | | 4 | | RETAIN |
| | 5 | 5 | — | X | DISCARD | |
| | | 6 | | 0 | | RETAIN |
| | 7 | 7 | 6 | 1 | RETAIN | |
| | | 8 | | 2 | | RETAIN |
| | 9 | 9 | 8 | 3 | RETAIN | |
| | | 10 | | 4 | | RETAIN |
| | 11 | 11 | — | X | DISCARD | |
| | | 12 | | 0 | | RETAIN |
| | 13 | 13 | 11 | 1 | RETAIN | |
| | | 14 | | 2 | | RETAIN |
| | 15 | 15 | 13 | 3 | RETAIN | |

FIG. 8

SCALING FACTOR = 9/16   $S_V = 7$

| DECIMAL FRAME-ROW NUMBER | BINARY FRAME-ROW NUMBER | BIT-REVERSED BINARY FRAME-ROW NUMBER | DECIMAL BIT-REVERSED FRAME-ROW NUMBER | DISCARD OR RETAIN? | NEW DECIMAL FRAME-ROW NUMBER |
|---|---|---|---|---|---|
| 0 | 0000 | 0000 | 0 | DISCARD | |
| 1 | 0001 | 1000 | 8 | RETAIN | 0 |
| 2 | 0010 | 0100 | 4 | DISCARD | |
| 3 | 0011 | 1100 | 12 | RETAIN | 1 |
| 4 | 0100 | 0010 | 2 | DISCARD | |
| 5 | 0101 | 1010 | 10 | RETAIN | 2 |
| 6 | 0110 | 0110 | 6 | DISCARD | |
| 7 | 0111 | 1110 | 14 | RETAIN | 3 |
| 8 | 1000 | 0001 | 1 | DISCARD | |
| 9 | 1001 | 1001 | 9 | RETAIN | 4 |
| 10 | 1010 | 0101 | 5 | DISCARD | |
| 11 | 1011 | 1101 | 13 | RETAIN | 5 |
| 12 | 1100 | 0011 | 3 | DISCARD | |
| 13 | 1101 | 1011 | 11 | RETAIN | 6 |
| 14 | 1110 | 0111 | 7 | RETAIN | 7 |
| 15 | 1111 | 1111 | 15 | RETAIN | 8 |

FIG. 9

SCALING FACTOR = 7/16   $S_H = 9$

| DECIMAL FRAME-COLUMN NUMBER | BINARY FRAME-COLUMN NUMBER | BIT-REVERSED BINARY FRAME-COLUMN NUMBER | DECIMAL BIT-REVERSED FRAME-COLUMN NUMBER | DISCARD OR RETAIN? | NEW DECIMAL FRAME-COLUMN NUMBER |
|---|---|---|---|---|---|
| 0 | 0000 | 0000 | 0 | DISCARD | |
| 1 | 0001 | 1000 | 8 | DISCARD | |
| 2 | 0010 | 0100 | 4 | DISCARD | |
| 3 | 0011 | 1100 | 12 | RETAIN | 0 |
| 4 | 0100 | 0010 | 2 | DISCARD | |
| 5 | 0101 | 1010 | 10 | RETAIN | 1 |
| 6 | 0110 | 0110 | 6 | DISCARD | |
| 7 | 0111 | 1110 | 14 | RETAIN | 2 |
| 8 | 1000 | 0001 | 1 | DISCARD | |
| 9 | 1001 | 1001 | 9 | RETAIN | 3 |
| 10 | 1010 | 0101 | 5 | DISCARD | |
| 11 | 1011 | 1101 | 13 | RETAIN | 4 |
| 12 | 1100 | 0011 | 3 | DISCARD | |
| 13 | 1101 | 1011 | 11 | RETAIN | 5 |
| 14 | 1110 | 0111 | 7 | DISCARD | |
| 15 | 1111 | 1111 | 15 | RETAIN | 6 |

FIG. 11

| BIT-REVERSED CURRENT FRAME-ROW | BIT-REVERSED NEXT FRAME-ROW | ROW MASK | ROW ADVANCE |
|---|---|---|---|
| DISCARD | DISCARD | DISCARD | 0 ROWS |
| DISCARD | RETAIN | DISCARD | 1 ROW |
| RETAIN | DISCARD | RETAIN | 1 ROW |
| RETAIN | RETAIN | RATAIN | 2 ROWS |

| | SCANNED FRAME-ROW | CURRENT/ NEXT FRAME-ROWS | BIT-REVERSED CURRENT/NEXT FRAME-ROWS | ROW MASK | FRAME-ROW STORED AT ROW ADDRESS | ROW ADDRESS ADVANCE |
|---|---|---|---|---|---|---|
| EVEN FIELD | 0 | 0/1 | 0000/1000 | DISCARD | - | +1 |
| | 2 | 2/3 | 0100/1100 | DISCARD | - | +1 |
| | 4 | 4/5 | 0010/1010 | DISCARD | - | +1 |
| | 6 | 6/7 | 0110/1110 | RETAIN | 3 | +2 |
| | 8 | 8/9 | 0001/1001 | DISCARD | - | +1 |
| | 10 | 10/11 | 0101/1101 | DISCARD | - | +1 |
| | 12 | 12/13 | 0011/1011 | DISCARD | - | +1 |
| | 14 | 14 | 0111 | RETAIN | 8 | |
| ODD FIELD | 1 | 1/2 | 1000/0100 | RETAIN | 0 | +1 |
| | 3 | 3/4 | 1100/0010 | RETAIN | 1 | +1 |
| | 5 | 5/6 | 1010/0110 | RETAIN | 2 | +2 |
| | 7 | 7/8 | 1110/0001 | RETAIN | 4 | +1 |
| | 9 | 9/10 | 1001/0101 | RETAIN | 5 | +1 |
| | 11 | 11/12 | 1101/0011 | RETAIN | 6 | +1 |
| | 13 | 13/14 | 1011/0111 | RETAIN | 7 | +2 |
| | 15 | 15 | 1111 | RETAIN | 9 | |

| FRAME-COLUMN NUMBER OF CURRENTLY SCANNED PIXEL | BIT-REVERSED CURRENT FRAME-COLUMN NUMBER | COLUMN MASK | COLUMN ADDRESS ADVANCE | STORED AT COLUMN ADDRESS |
|---|---|---|---|---|
| 0 | 0000 | DISCARD | 0 | - |
| 1 | 1000 | RETAIN | +1 | 0 |
| 2 | 0100 | DISCARD | 0 | - |
| 3 | 1100 | RETAIN | +1 | 1 |
| 4 | 0010 | DISCARD | 0 | - |
| 5 | 1010 | RETAIN | +1 | 2 |
| 6 | 0110 | RETAIN | +1 | 3 |
| 7 | 1110 | RETAIN | +1 | 4 |
| 8 | 0001 | DISCARD | 0 | - |
| 9 | 1001 | RETAIN | +1 | 5 |
| 10 | 0101 | RETAIN | +1 | 6 |
| 11 | 1101 | RETAIN | +1 | 7 |
| 12 | 0011 | DISCARD | 0 | - |
| 13 | 1011 | RETAIN | +1 | 8 |
| 14 | 0111 | RETAIN | +1 | 9 |
| 15 | 1111 | RETAIN |  | 10 |

| CURRENTLY SCANNED FRAME-ROW | BIT-REVERSED CURRENT FRAME-ROW NUMBER | ROW MASK | FRAME-ROW STORED AT ROW ADDRESS | ROW ADDRESS ADVANCE |
|---|---|---|---|---|
| 0 | 0000 | DISCARD | - | 0 |
| 1 | 1000 | RETAIN | 0 | +1 |
| 2 | 0100 | DISCARD | - | 0 |
| 3 | 1100 | RETAIN | 1 | +1 |
| 4 | 0010 | DISCARD | - | 0 |
| 5 | 1010 | RETAIN | 2 | +1 |
| 6 | 0110 | RETAIN | 3 | +1 |
| 7 | 1110 | RETAIN | 4 | +1 |
| 8 | 0001 | DISCARD | - | 0 |
| 9 | 1001 | RETAIN | 5 | +1 |
| 10 | 0101 | RETAIN | 6 | +1 |
| 11 | 1101 | RETAIN | 7 | +1 |
| 12 | 0011 | DISCARD | - | 0 |
| 13 | 1011 | RETAIN | 8 | +1 |
| 14 | 0111 | RETAIN | 9 | +1 |
| 15 | 1111 | RETAIN | 10 | |

BIT-REVERSING METHOD AND SYSTEM FOR LINEAR IMAGE SCALING

FIELD OF THE INVENTION

The present invention relates to displaying image frames on a display device. In particular, the present invention relates to scaling down the frames to be displayed on a display device in the vertical direction, the horizontal direction, or both.

BACKGROUND OF THE INVENTION

FIG. 1 depicts a display system 100 which may be part of a computer system. The display system 100 includes an address generator 112 which receives the PIX CK (pixel clock), HSYNC, and VSYNC signals as inputs and outputs the address of pixels of an image frame to a frame buffer 114. The frame buffer 114 typically includes one or more VRAMs for storing the pixel data of the frames. The frame buffer 114 outputs each addressed pixel from a serial port 115 thereof to a display device 116 such as a CRT or LCD. In addition, a control device 118, such as a CPU, can access the pixels of the frames in the frame buffer 114 via a random access port 113 thereof.

FIG. 2 depicts a frame 120 and a display screen 122 of the display device 116 (FIG. 1) for displaying the frame. The display screen 122 is organized into a number of horizontal scan-lines and a number of vertical scan-columns of pixels. Likewise, each frame 120 is organized into a number of horizontal frame-rows and vertical frame-columns of pixel data.

The pixels of each frame-row of the frame 120 are typically displayed on a corresponding scan-line of the display screen 122 in a raster-like fashion from left to right and from top to bottom. For example, in a display scheme called "non-interlace", the $0^{th}$ frame-row of pixels is displayed on the $0^{th}$ scan-line, followed by the display of the $1^{st}$ frame-row on the $1^{st}$ scan-line, etc. until the last frame-row is displayed on the last scan-line. In an alternative display scheme called "interlace," each frame is divided into P fields where a $p^{th}$ frame (where $1 \leq p \leq P$) contains the p–1, p–1+P, p–1+2P, p–1+3P, . . . frame-rows. In an interlace display scheme, a frame is displayed by alternately displaying each field. For example, if P=2, then frame-rows 0,2,4,6, . . . form a first field called the even field and frame-rows 1,3,5,7, . . . form a second field called the odd field. The even field is first displayed, i.e., the $0^{th}$ frame-row is displayed on the $0^{th}$ scan-line, followed by the display of the $2^{nd}$ frame-row on the $2^{nd}$ scan-line, followed by the display of the $4^{th}$ frame-row on the $4^{th}$ scan-line, etc. Then the odd field is displayed, i.e., the $1^{st}$ frame-row is displayed on the $1^{st}$ scan-line followed by the display of the $3^{rd}$ frame-row on the $3^{rd}$ scan-line, etc.

Often, it is desirable to scale-down or shrink the frames in the horizontal direction, the vertical direction, or both. Some systems can only scale a frame by a fixed, non-selectible scaling factor while other systems can scale a frame by a selectible scaling factor. The latter systems provide greater flexibility for use in a variety of applications.

The scaling process may be viewed as two steps. First, the number of pixels or rows are selectively reduced in the scaled direction according to a scaling factor. Then, the remaining pixels or frame-rows are merged together.

An averaging method for reducing pixels is illustrated in FIG. 3. As shown in FIG. 3, a frame may be easily scaled in the horizontal direction for either interlaced or non-interlaced displays. For example, to scale an image by I=⅚, the pixels in every $6^{th}$ frame-column are discarded. The remaining pixels are then consecutively renumbered in order so that the resulting frame is contiguous.

Similarly, as shown in FIG. 4, a non-interlaced frame can be scaled by the scaling factor J in the vertical direction by periodically discarding frame-rows. For instance, a circuit may be provided which receives the HSYNC signal and periodically discards a frame-row every N HSYNC pulses. If J=½ then a frame-row is discarded every N=2 HSYNC pulses or every other frame-row, i.e., frame-rows 1,3,5,7, . . . are discarded. The remaining frame-rows 0,2,4,6,8 may be displayed on consecutive scan-lines 0,1,2,3,4, . . . of the display device.

Advantageously, the horizontal and vertical scaling processes are performed in real time as the frame-rows of the frame are scanned for display. However, the real-time averaging method for reducing frame-rows in a real-time vertical scaling process produces disadvantageous results in an interlace display. For example, FIG. 5 illustrates a real-time averaging method for scaling an interlace image with P=2 fields by a scaling factor of J=½. As shown, every other frame-row is discarded during the display of each field. Thus, during the display of the even field, the frame-rows 2,6,10,14, . . . are discarded and during the display of the odd field the frame-rows 3,7,11,15 are discarded. Thus, the frame-rows 0,1,4,5,8,9,12,13, . . . are displayed on scan-lines 0,1,2,3,4,5,6,7, . . . of the display device. However, because consecutive adjacent frame-rows are discarded, i.e., 2–3, 6–7, 10–11, etc., the resulting image displayed on the display device has annoying discontinuities.

FIG. 6 shows a conventional circuit disclosed in U.S. Pat. No. 5,025,315 which overcomes this problem. Consider the case where P=2 fields are alternately displayed. The circuit has a two-phase clock generator 15 for generating two successive clock pulses for each HSYNC pulse. The first clock pulse corresponds to the frame-row currently being scanned while the second clock pulse corresponds to the very next frame-row. The clock pulses are fed to a modulo N counter 20 which outputs a signal indicating whether or not to discard the corresponding frame-row. The outputted indication for each clock is stored in a separate circuit FF4 or FF5. The indication stored in the circuit FF4 corresponds to the currently scanned frame-row and the indication stored in the circuit FF5 corresponds to the next consecutive frame-row of the frame (which is part of the other field that is not 5 currently scanned). For example, as shown in FIG. 7, during the scan of the even field, at the HSYNC pulse of the frame-row 0, indications of whether or not to discard the frame-rows 0 and 1 are stored in the circuits FF4, FF5, respectively. At the HSYNC pulse for the frame-row 2, indications of whether or not to discard the frame-rows 2 and 3 are stored in the circuits FF4 and FF5, respectively. Likewise, at the HSYNC pulse for the frame row 4, indications of whether or not to discard the frame-rows 4 and 5, are stored in the circuits FF4 and FF5, respectively, etc. The modulo N counter 20 outputs a discard indication every $N^{th}$ clock pulse, i.e., every $N^{th}$ frame-row. On every other clock pulse, the module N counter 20 outputs a retain indication.

If the current frame-row is retained, it is stored in the frame buffer at the frame-row address pointed to by a row address counter 35 (FIG. 6) and a logic circuit 30 (FIG. 6) increments the row address counter 35 (FIG. 6) by one. If the current frame-row and the next frame row are retained, the current frame-row is stored in the frame buffer and the logic circuit 30 (FIG. 6) increments the row address counter 35

(FIG. 6) by two. This leaves a blank storage space in the frame buffer for storing the next frame-row when its field is scanned. Likewise, if the current frame-row is discarded but the next frame-row is retained, nothing is stored in the buffer. However, the logic circuit 30 (FIG. 6) increments the row address counter 35 (FIG. 6) so as to leave a blank storage space for storing the next frame-row during the scan of its field. Lastly, if both the current frame-row and the next frame-row are discarded, then nothing is stored in the frame buffer and the logic circuit 30 (FIG. 6) does not increment the row address counter 35 (FIG. 6).

When the next field is displayed, the row address counter 35 is reset to point to the first of the blank spaces left for storing frame-rows. Thereafter, the above process is repeated for the other field. For example, as shown in FIG. 7, during the scan of the odd field, the circuit determines at the HSYNC pulse corresponding to the frame-row 1 whether or not to discard the frame-rows 1 and 2, at the HSYNC pulse corresponding to the frame-row 3 whether or not to discard the frame-rows 3 and 4, etc. In response to these determinations, the row address counter 35 (FIG. 6) is incremented so that the frame-rows of the odd field are stored in the aforementioned blank spaces in the frame buffer created during the scan of the even field.

The prior art circuit is disadvantageous in that it is complex and requires complex circuitry. This relates to the complexity of the real-time averaging process in the frame reduction step. The prior art real-time averaging process requires maintaining a count of the frame-columns (in horizontal scaling) or frame-rows in (vertical scaling). The determination of whether to discard or retain pixels of frame-rows depends on this running count. Thus, each determination depends on the previous determination and hence, all determinations must be done serially, i.e., sequentially. This complicates the real-time scaling process of P field interlace frames because during the scan of each frame-row of each field, the merge process must allocate space for the next P−1 frame-rows of the other, non-displayed fields. Thus, the merge process is delayed until the reduction step is serially performed on each of the P frame-rows examained during the scan of each frame-row. As a result, the merge step is greatly complicated and encumbered. The net result is that both the reduction and merge steps consume much time and effort, and require complex circuitry.

It is therefore an object of the present invention to overcome the disadvantages of the prior art.

SUMMARY OF THE INVENTION

The present invention achieves these objects utilizing a pixel reduction step with a bit-reversing method and a simplified merging step. Consider first the case of vertically scaling an image frame. In the bit-reversing method, the number of each frame-row is expressed in binary form. Thus, in a 16×16 display, the frame-rows 0, 1, 2, 3, 4, 5, 6, 7, 8, 9, 10, 11, 12, 13, 14, 15 are expressed as 0000, 0001, 0010, 0011, 0100, 0101, 0110, 0111, 1000, 1001, 1010, 1011, 1100, 1101, 1110, 1111. The bits of each frame-row number are then reversed, e.g., to produce 0000, 1000, 0100, 1100, 0010, 1010, 0110, 1110, 0001, 1001, 0101, 1101, 0011, 1011, 0111, 1111. (The bit-reversed frame-row numbers expressed in decimal are 0, 8, 4, 12, 2, 10, 6, 14, 1, 9, 5, 13, 3, 11, 7, 15, respectively.) To discard N frame-rows, the bit-reversed frame-row numbers are compared to the number N. If the bit-reversed frame-row number is less than N, the corresponding frame-row is discarded. Otherwise, the frame-row is retained. The number N is illustratively selected using the formula N=C−AC/B where A/B is the scaling factor and C is the dimension of the frame in the scaling direction. For instance, to vertically scale a 16 frame-row×16 frame-column image frame by the scaling factor ⅝, N=16−(5·16)/8=6 frame-rows must be discarded. Thus, frame-rows 0 (0000 in reverse binary), 2 (0100 in reverse binary), 4 (0010 in reverse binary), 8 (0001 in reverse binary), 10 (0101 in reverse binary) and 12 (0011 in reverse binary) are discarded. The number N is referred to herein as a "scaling constant."

Using the bit-reversing method, it is possible to determine whether any frame-row selected at random is to be discarded or retained. In other words, the determination for each frame-row is independent of each other frame-row. In addition, the bit-reversing method requires a simple bit-reversal and comparison and thus may be implemented with simple circuitry. Thus, the bit-reversing method may be readily adapted for determining whether to discard or retain several frame-rows in parallel. In the case of an interlace display, it is thus possible to determine, in parallel, whether or not to discard each of P consecutive frame-rows, for a P-field interlace display. Because this is possible, the merge process may be simplified. For instance, it is not necessary to sequentially determine whether each frame-row is discarded or retained in order to determine the number of blank spaces that must be allocated for retained frame-rows of the P−1 fields not currently scanned. Rather, because the determination for each of the P consecutive frame-rows is made at one time, an adequate number of spaces depending on the total number of retained frame-rows simply may be skipped in the frame buffer in a single step.

According to one embodiment of the invention, a linear image scaling circuit is provided for scaling an image frame vertically, horizontally, or both in a P-field interlace display. A counter circuit receives the HSYNC and VSYNC signals and outputs binary representations of the currently scanned frame-row and the P−1 subsequent frame-rows. For example, if P=2, then the binary representations 0000, 0001 of the frame-rows 0 and 1 are outputted during the scan of frame-row 0, the binary representation 0010 and 0011 of the frame-rows 2 and 3 are outputted during the scan of frame-row 2, etc. These binary representations are inputted to a converter circuit which reverses the bits of the binary representation of each frame-row. These bit-reversed binary representations are inputted to a comparator circuit. The comparator circuit also receives a vertical scaling constant (or a horizontal scaling constant, or both) which scaling constant is illustratively selectible. The comparator circuit compares each bit-reversed binary representation with the scaling constant in accordance with the above-described method. The comparator outputs an appropriate signal to an address generator indicating how many of the P frame-rows are retained.

In response to this signal, the address generator advances a pointer, which points to the next available frame-row storage space of a frame buffer, an appropriate amount so as to allocate sufficient storage space in the frame buffer for storing each frame-row. In addition, the comparator circuit outputs mask signals to a scaling controller. Using these mask signals, the scaling controller selectively stores each retained frame-row appearing on a video input in the frame buffer at the address pointed to by the address generator. The scaling controller also discards the discarded frame-rows depending on the mask signals.

The linear image scaling circuit is also (or alternatively) capable of horizontally scaling an image frame. For instance, the counter circuit illustratively receives a PIX CK or pixel clock signal in addition to the HSYNC and VSYNC signals. In response to the HSYNC and PIX CK signals, the counter circuit illustratively outputs the frame-column number of the currently scanned pixel. The frame-column number is bit-reversed in the converter circuit and then inputted to the comparator circuit. The comparator circuit also receives a horizontal scaling factor which equals the number of pixels to be discarded in each frame-row of the image frame. If the bit-reversed frame-column number of the currently scanned pixel is greater than or equal to the horizontal scaling factor, a signal is outputted to the address generator to advance a frame-column pointer, which points to the next available pixel storage space of the frame buffer, by one pixel storage space. Furthermore, a signal is outputted to the scaling controller to store the currently scanned pixel appearing on the video input in the frame buffer at the address pointed to by the address generator. If the bit-reversed frame-column number is less than the horizontal scaling factor, a mask signal is outputted to the scaling controller so that the pixel appearing at the video input is discarded.

In short, the present invention provides a linear video image scaling method and system which employs a bit-reversing method for reducing an image frame. This not only simplifies the frame reduction step but also the merging step.

BRIEF DESCRIPTION OF THE DRAWINGS

FIG. 3 illustrates a conventional averaging method for reducing a frame in the horizontal direction.

FIG. 4 illustrates a conventional averaging method for reducing a frame in the vertical direction in a non-interlace display.

FIG. 5 illustrates a conventional real-time averaging method for reducing a fame in the vertical direction in an interlace display.

FIG. 7 illustrates the operation of the conventional circuit shown in FIG. 6.

FIG. 8 illustrates the bit-reversing method for vertically reducing an image frame according to the present invention.

FIG. 9 illustrates the bit-reversing method for horizontally reducing an image frame according to the present invention.

FIG. 11 illustrates the row mask and row address advance signals outputted by the comparator circuit of the linear image scaling circuit shown in FIG. 10.

FIG. 12 illustrates the row mask and row address advance signals generated by the bit-reversing linear image scaling circuit of FIG. 10.

FIG. 13 illustrates the column mask and column address signals generated by the bit-reversing linear image scaling circuit of FIG. 10.

FIG. 14 illustrates the row mask and row address signals generated by the bit-reversing linear image scaling circuit of FIG. 10 in a non-interlace display.

DETAILED DESCRIPTION OF THE INVENTION

Figures 1, 2:
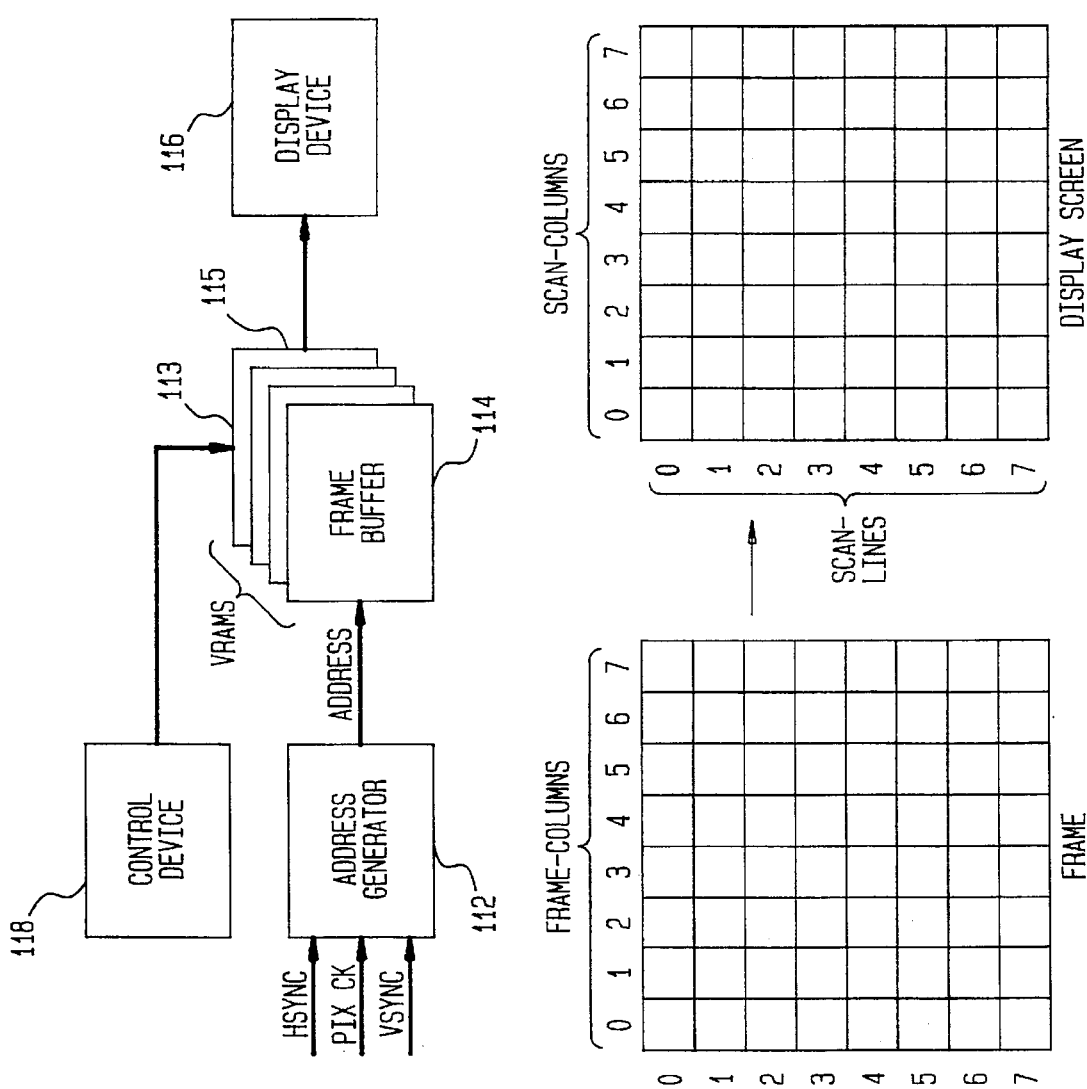
FIG. 1 depicts a conventional display system.
FIG. 2 depicts the organization of a frame buffer and a display screen of a display device.
Figure 6:
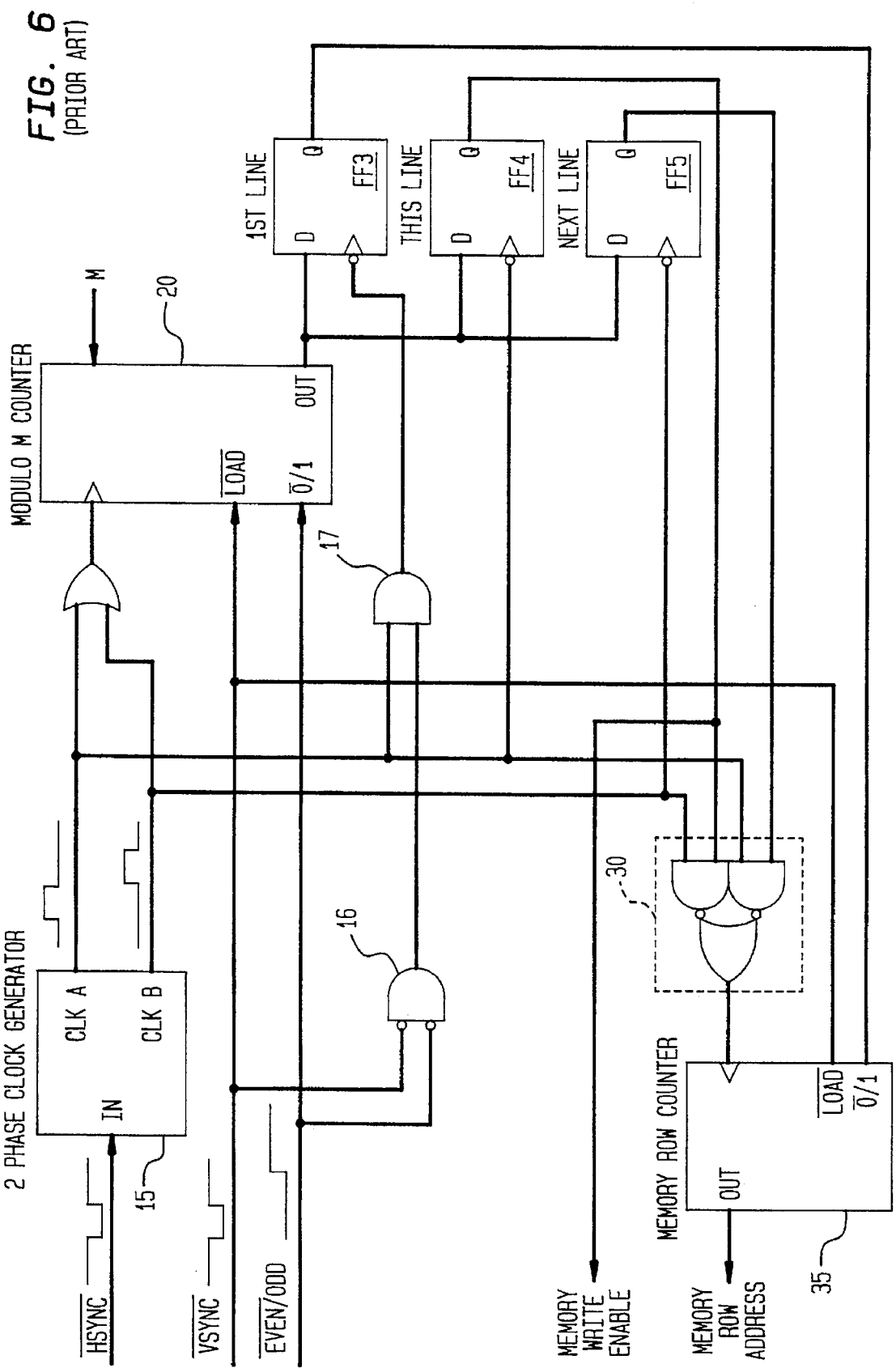
FIG. 6 depicts a conventional circuit using the real-time averaging method for reducing and merging a frame for an interlace display.

Referring to FIG. 8, the linear image scaling process will be described in greater detail. In FIG. 8, it is assumed for the sake of discussion that a frame having 16 frame-rows is vertically scaled in a non-interlace display scheme by a scaling factor of 9/16. The vertical scaling constant $S_V$ (or number of frame-rows to be discarded) may be determined from the formula $S_V=C-AC/B$ where C is the dimension of the image frame in the direction of scaling (in this case, the number of frame-rows) and A/B is the scaling factor. Thus, $S_V=16-(16\cdot 9)/16=7$ of the 16 frame-rows must be discarded. Column 1 of FIG. 8 shows the frame-row number of each frame-row expressed in decimal. Column 2 shows the frame-row numbers expressed in binary. Column 3 shows the binary representations of each frame-row number with the bits in reverse order. Column 4 shows each bit-reversed frame-row number expressed in decimal. For example, the frame-row number 3 is 0011 in binary, 1100 in bit-reversed binary, and the decimal equivalent of the bit-reversed binary representation 1100 is 12.

The bit-reversed frame-row number of each frame-row is compared to the scaling constant $S_V=7$. If the bit-reversed frame-row number is greater than or equal to $S_V=7$, the frame-row is retained. If the bit-reversed frame-row number is less than $S_V$, the frame-row is discarded. As shown in column 5, frame-rows 0,2,4,6,8,10, and 12 are discarded and frame-rows 1,3,5,7,9,11,13,14, and 15 are retained. The retained frame-rows are merged together to form a scaled frame by reassigning frame-row numbers to the retained frame-rows as shown in column 6.

Several observations may be made regarding the vertical scaling process illustrated in FIG. 8. First, the determination of whether to discard or to retain a given frame-row is completely independent of the determinations for each other frame-row. Additionally, the determination of whether to discard or retain a particular frame-row requires simple bit-reversal and comparison steps which may be performed by simple circuitry. The image frame reduction process may thus be readily adapted to determine whether to discard or retain several frame-rows in parallel.

Second, for scaling factors of ½ or smaller, only even numbered frame-rows are discarded. In addition, the frame-rows selected for discarding by the bit-reversing method are not concentrated in any region of the frame. This is advantageous in an interlace display with P=2 fields (even and odd fields) for producing a smooth scaled image frame without annoying discontinuities.

In an analogous fashion to the vertical scaling method described above, the bit-reversing method may be applied to horizontal scaling. For instance, as shown in FIG. 9, an image frame with 16 frame-columns is horizontally scaled by the scaling factor 7/16. In this case, the horizontal scaling constant $S_H$ may be set at 9 by the formula $C-AC/B$ where C is the number of frame-columns of the image and A/B is the horizontal scaling factor 7/16. Thus, $S_H=16-(16\cdot 7)/16=9$ pixels must be dropped in each frame-row. In FIG. 9, column 1 contains the frame-column number of each pixel, column 2 contains the binary representation of each frame-column number, column 3 contains the bit-reversed binary representation of each frame-column and column 4 contains the decimal representation of the bit-reversed numbers of column 3. Column 5 shows that pixels 0,1,2,4,6,8,10,12, and 14 are discarded and pixels 3,5,7,9,11,13, and 15 are retained. The retained pixels of each frame-row are then merged together to form the scaled frame as shown in column 6.

Figure 10:
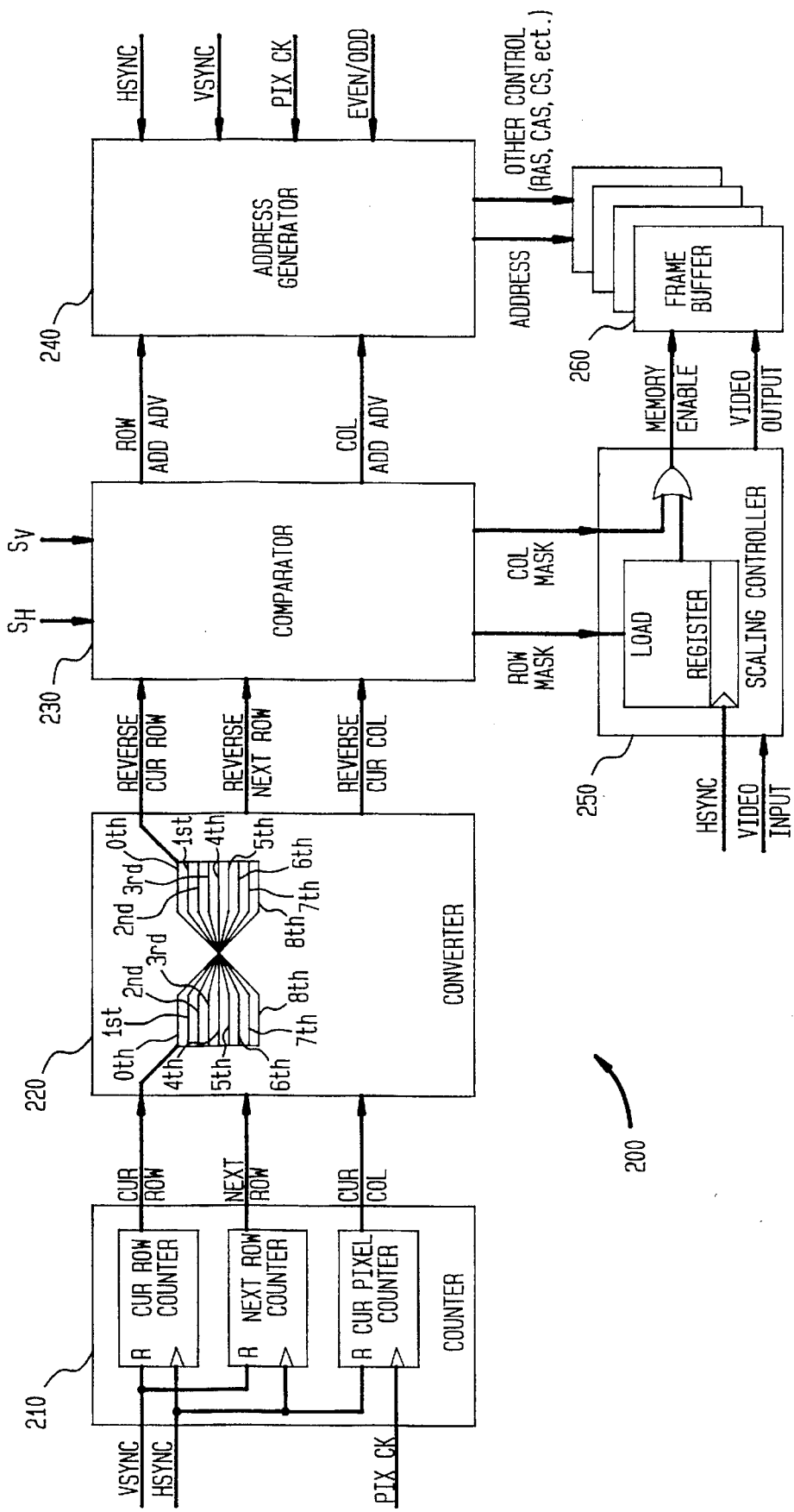
FIG. 10 depicts a bit-reversing linear image scaling circuit according to one embodiment of the present invention.

FIG. 10 shows a real-time linear image scaling circuit 200 according to one embodiment of the invention. Illustratively, the circuit 200 shown in FIG. 10 is capable of scaling an interlace frame having P=2 fields, although as will be shown, the circuit 200 may be adapted for scaling frames with any number of fields. In the real-time vertical scaling of interlace frames, each of the P fields of the frame are alternately displayed. As discussed below, the circuit 200 scales frames in an interlace display without introducing annoying discontinuities in the scaled frame.

The invention has a counter circuit 210 which receives the VSYNC, HSYNC and PIX CK (pixel clock) signals. A pulse appears on the VSYNC signal input prior to the display of each frame, in a non-interlace display, or each field of each frame in an interlace display. The HSYNC signal has a pulse which occurs prior to the scan of each frame-row. The PIX CK has a pulse corresponding to the scan of each pixel of each frame-column in each frame-row.

In response to the HSYNC, VSYNC and PIX CK signals, the counter 210 outputs the number of the currently scanned frame-row, the number of the next frame-row (of the field not currently scanned) and the frame-column number of the currently scanned pixel. The counter 210 is capable of outputting the current and next frame-row numbers and the current frame-column number in parallel. For instance, the counter circuit 210 can have three separate counters, one for the current frame-row, one for the next frame-row and one for the current frame-column. The current frame-column counter is reset to zero every HSYNC pulse and is incremented by one every PIX CK pulse. The current frame-row counter is reset to 0 on the VSYNC pulse preceding the even field and to 1 on the VSYNC pulse preceding the odd field. The next frame-row counter is reset to 1 on the VSYNC pulse preceding the even field and to 2 on the VSYNC pulse preceding the odd field. Both the current and next frame-row counters are incremented by one every HSYNC pulse.

The current frame-row number, the next frame-row number and current frame-column number are inputted to a converter circuit 220. The converter circuit 220 reverses the bits of each of these numbers. The bits of a binary number may be easily reversed as follows. Suppose the current frame-row number has L=9 bits 0, 1, 2, 3, 4, 5, 6, 7, 8 which each propagate on a corresponding $1^{th}$ ($1 \le 1 \le L$), i.e., $0^{th}$, $1^{st}$, $2^{nd}$, $3^{rd}$, $4^{th}$, $5^{th}$, $6^{th}$, $7^{th}$ to $8^{th}$ bit-line, respectively. The converter circuit 220 bit-reverses each binary number by outputting each $1^{th}$ bit on the $(L-1)^{th}$ bit-line. That is, the $0^{th}$ bit is outputted on the $8^{th}$ bit-line, the $1^{st}$ bit on the $7^{th}$ bit-line, etc. Thus, the converter circuit 230 may simply comprise L wires for determining the bit-reversed current frame-row number which wires each connect an $1^{th}$ bit output terminal of the counter circuit 210 with an $(L-1)^{th}$ bit output terminal of the converter circuit 220.

The bit-reversed current frame-row number, next frame-row number and current frame-column number are inputted to a comparator circuit 230. The comparator circuit 230 also receives a horizontal scaling constant $S_H$ and a vertical scaling constant $S_V$. The comparator circuit 230 compares the bit-reversed current and next frame-row numbers to the vertical scaling constant $S_V$. If the bit-reversed current frame-row number is greater than or equal to $S_V$, then the current frame-row is to be retained. If the bit-reversed current frame-row number is less than $S_V$, the current frame-row is to be discarded. Likewise, the next frame-row is to be retained if the bit-reversed next frame-row number is greater than or equal to $S_V$, and to be discarded if the bit-reversed next frame-row number is less than $S_V$. Depending on these two comparisons, the comparator 230 outputs a row mask signal to the scaling controller 250 and a row address advance signal to the address generator 240.

In an analogous fashion, the comparator 230 compares the bit-reversed current frame-column number with the horizontal scaling constant $S_H$. If the bit-reversed current frame-column number is greater than or equal to $S_H$, the pixel in the current frame-column is to be retained; otherwise, it is to be discarded. Depending on this comparison, the comparator circuit outputs a column mask signal to the scaling controller 250 and a column address advance signal to the address generator 240.

The scaling controller 250 receives the pixels of each frame-row of a frame via a video input in the order from the lowest numbered frame-column to the highest frame-column and from the lowest numbered frame-row to the highest numbered frame-row. In response to the column mask signal indicating that a pixel is to be discarded, the scaling controller 250 discards the pixel currently being inputted on the video input. This may illustratively be achieved by outputting a signal to the memory enable control input of the frame buffer 260 which signal disables the frame buffer 260. In response to the row mask signal indicating that a frame-row is to be discarded, the scaling controller discards an entire frame-row of pixels (regardless of the column mask signal). Illustratively, the row mask indication is clocked into a register in the scaling controller 250 (with the HSYNC signal serving as a clock input for the register). The output of the register containing the row mask indication illustratively may be fed to the memory enable control input of the frame buffer 260.

The address generator 240 maintains a row address pointer which points to an address in the frame buffer 260 for storing a row of pixels of a frame. The address generator 240 also maintains a column address pointer for pointing to an address in the frame buffer 260 for storing a pixel in a particular frame-column of a frame-row pointed to by the row address pointer. Using these two pointers, the address generator 240 generates appropriate addresses for storing pixels in the storage locations of the frame buffer 260 pointed to by the pointers. The address generator may also generate other appropriate control signals such as row address select, column address select, and chip select signals.

The address generator illustratively also receives the HSYNC, VSYNC, PIX CK and EVEN/ODD (which indicates whether the even or odd field is currently being scanned) signals. Illustratively, the column address pointer is reset to zero every HSYNC pulse and incremented on a PIX CK pulse if the address generator 240 receives a column address advance signal for advancing the column address pointer. The row address pointer is illustratively reset to zero at a VSYNC pulse which precedes an even frame, and reset to 0 or 1 (whichever is the first empty storage location in the frame buffer 260) at a VSYNC pulse which precedes an odd frame. The row address pointer is advanced by 0, 1 or 2 rows, depending on the row address advance signal, every HSYNC pulse.

FIG. 11 illustrates the row mask and row address advance signals which may be generated for vertically scaling an interlaced frame having P=2 frames. FIG. 11 shows the row mask and row address advance signals outputted from the comparator circuit 230 to the scaling controller circuit 250 and the address generator 240 depending on whether the current frame-row and/or next frame-row are to be retained or discarded. Suppose the current frame-row and the next frame-row are both to be discarded (i.e., the bit-reversed current and next frame-row numbers are less than $S_V$). A mask signal indicating that the current frame-row is to be discarded is outputted to the scaling controller 250 thereby discarding the currently scanned frame-row of pixels appearing on the video input. Furthermore, because neither frame-row is to be retained, no space need be allocated in the frame buffer 260 and thus a row address advance signal indicating that the row address pointer should be maintained at its current value is outputted to the address generator 240.

In the case that the current frame-row is to be retained but the next frame row is to be discarded, a mask signal indicating that the current frame-row is to be retained is outputted to the scaling controller 250. This causes the scaling controller 250 to enable the frame buffer 260 for storing the pixels of the current frame-row in frame buffer 260 (except as pixels in particular frame-columns are to be discarded, as discussed below) at the row address pointed to by the row address pointer of the address generator 260. In addition, a row address advance signal is outputted to the address generator 240 to cause the address generator 240 to advance the row address pointer to point to the very next row address.

In the case that the current frame-row is to be discarded but the next frame-row is to be retained, a mask signal indicating that the current frame-row is to be discarded is outputted to the scaling controller 250. However, a row address advance signal is outputted to the address generator 240 for causing the row address pointer to advance to the very next row address. Although the current frame-row is not stored at the row address initially pointed to by the row address pointer, by advancing the row address pointer, a blank space is left in the frame buffer for storing the next frame-row (when the field including the next frame-row is scanned).

In the case that both the current frame-row and the next frame-row are both to be retained, a mask signal indicating that the current frame-row is to be retained is outputted to the scaling controller 250. Thus, the pixels of the current frame-row are stored in the frame buffer 260 at the row address pointed to by the row address pointer. Furthermore, a row address advance signal for causing the row address pointer to be advanced two row addresses is outputted to the address generator 240. This ensures that a subsequent retained frame-row is stored in the frame buffer 260 two row addresses from the current frame-row so that a blank space is left for storing the next frame-row in the frame buffer 260 during the scan of the field containing the next frame-row.

In the case that neither the current frame-row or the next frame-row is to be retained, an appropriate mask signal is outputted to the scaling controller 250 for causing the pixels of the current-frame row to be discarded. Furthermore, a row address advance signal is outputted to the address generator 240 for causing the row address pointer to maintain its current value.

The column mask and column address advance signals are generated as follows. If a pixel in a particular frame-column is to be retained, an appropriate column mask signal is outputted to the scaling controller 250 for causing the current pixel, which appears on the video input, to be stored in the frame buffer 260 at the storage space pointed to by the column address pointer (unless, as mentioned above, the frame-row is to be discarded). Furthermore, a column address advance signal is outputted to the address generator 240 for incrementing the column address pointer by one. If a pixel in a particular frame-column is to be discarded, an appropriate mask signal is outputted to the scaling controller 250 for discarding the current pixel which appears on the video input. Furthermore, a column address advance signal is outputted to the address generator 240 for maintaining the column address pointer at its current value.

FIG. 12 illustrates how the circuit 200 vertically scales an image frame and FIG. 13 illustrates how the circuit 200 horizontally scales an image frame. An example will now be discussed with reference to FIGS. 10, 12 and 13. Suppose it is desired to scale a 16 frame-row×16 frame-column image frame by a horizontal scaling factor of $^{11}/_{16}$ and a vertical scaling factor $^{10}/_{16}$ in an interlace display with P=2 fields. In such a case, $S_H$=5 and $S_V$=6. First, the even field is scanned. On the HSYNC pulse corresponding to the $0^{th}$ frame-row, the counter circuit 210 outputs the binary representations of the current frame-row number 0 and the next frame-row number 1, i.e., 0000 and 0001. These frame-row numbers are then bit-reversed in the converter circuit 220 to produce 0000 and 1000. The bit-reversed frame-row numbers 0000 and 1000 are then compared to $S_V$=6 in the comparator circuit 230. Because the bit-reversed current frame-row number 0000 is less than 6, a mask signal which discards the entire current frame-row 0 is outputted to the scaling circuit 250. However, because the bit-reversed next frame-row number 1000 is greater than or equal to $S_V$=6, a row address advance signal for incrementing the row address pointer by one is outputted to the address generator 240. This advances the row address pointer to point to the row address 1.

The counter circuit 210 sequentially outputs the binary representations of the frame-column numbers 0000,0001, 0010, . . . ,1111 of the pixel corresponding to each PIX CK pulse. These frame-column numbers are bit-reversed in the converter circuit 220 to produce 0000,1000,0100, . . . ,1111. The bit-reversed frame-column numbers 0000,1000,0100, . . . ,1111 are compared to $S_H$=5. As shown, the bit-reversed frame-column numbers 0000,0001,0010,0011, and 0100 corresponding to frame columns 0,8,4,12 and 2 are discarded. Thus, mask signals are outputted for discarding the pixels in the frame-columns 0,2,4,8, and 12 and for retaining the pixels in the frame columns 1,3,5,6,7,9,10,11,13,14, and 15. However, because all pixels in the frame-row 0 are discarded, none of these pixels is stored in the frame buffer 260. In addition, a column address advance signal for maintaining the column pointer is generated for the frame-column numbers 0,2,4,8, and 12 and for advancing the column pointer by one for the frame-column numbers 1,3, 5,6,7,9,10,11,13,14, and 15. This causes the column address pointer to advance to 1 for the frame-column number 1, to 2 for the frame-column number 3, to 3 for the frame-column number 5, etc.

On the next HSYNC (corresponding to the frame-row 2) the binary representations of the frame-row numbers 2 and 3 are outputted from the clock circuit 210. The frame-row numbers are bit-reversed in the converter circuit 220 to produce 0100 and 1100. These numbers are compared to $S_V$=6. In this case, frame-row 2 is discarded and frame-row 3 is retained. Thus, the comparator circuit 230 outputs a row mask signal which discards the pixels of the row 2. Again, a row address advance signal is outputted for advancing the row address pointer by one to point to the row address 2.

The horizontal scan of the pixels in each frame-column of the frame-rows 2, and 4 produce identical results as with the frame-row 0. Furthermore, the vertical scaling at the HSYNC signal for the frame-row 4 produces similar results as that for the frame-rows 0 and 2, with the row address pointer advancing to 3. For purposes of brevity, these discussions are omitted.

On the HSYNC corresponding to the frame-row 6, the binary representations of the frame-row numbers 6 and 7 are outputted from the clock circuit 210. The frame-row numbers are bit-reversed in the converter circuit 220 to produce 0110 and 1110. These numbers are compared to $S_V$=6. In this case, both the current frame-row 6 and the next frame-row 7 are to be retained. Thus, the comparator circuit 230 outputs a row mask signal which retains the pixels of the frame-row 6 (except as discarded by the horizontal scaling process). A row address advance signal is outputted for advancing the row address pointer by two to the value 5. Thus, the retained pixels of frame-row 6 are stored in the row address 3 and row address 4 is left blank for storage of the retained pixels of frame-row 7. The vertical scaling process continues in a similar fashion for the remaining frame-rows 8, 10, 12 and 14 of the even field.

At the HSYNC pulse corresponding to the odd field, the row address pointer in the address generator 240 is reset to 0 (the first empty storage location in the frame buffer 260). The counter circuit 210 outputs the bit representations of the frame-row numbers 1 and 2, i.e., 0001 and 0010 to the converter circuit 220. These frame-row numbers are then bit-reversed in the converter circuit 220 to produce 1000 and 0100, respectively. The bit-reversed current frame-row number 1000 and next frame-row number 0100 are then compared to $S_V=6$. Because the bit-reversed current frame-row number is greater than or equal to $S_V$, a mask signal indicating that the current frame-row is to be retained is outputted to the scaling controller 250. However, because the bit-reversed next frame-row number is less than $S_V$, a row address advance signal for advancing the row address pointer by only one row address is outputted to the address generator 240. Thus, the retained pixels in frame-row 1 (i.e., in frame-columns 1,3,5,6,7,9,10,11,13,14, and 15) are stored at row address 0 of the frame buffer 260. Thereafter, the row address pointer is advanced to point to the row address 1.

During the scan of the frame-row 3, the comparator circuit 230 determines that frame-row 3 is retained and that frame-row 4 is discarded. Retained pixels of frame-row 3 are stored at row address 1 of the frame buffer 260 and the row address pointer is advanced to point to the row address 2. During the scan of the frame-row 5, the comparator circuit determines that both frame-rows 5 and 6 are retained. Thus, retained pixels of frame-row 5 are stored at row address 2 of the frame buffer 260 and the row address pointer is advanced to point to the row address 4. This process continues during the scan of the odd field to store the retained pixels of the frame-rows of the odd field in the blank spaces of the frame buffer 260 created during the scan of the even field.

The circuit 200 may be easily adapted for any number of fields by comparing the bit-reversed current frame-row number and the P-1 bit-reversed next frame-row numbers with the scaling factor $S_V$ in the comparator circuit 230. This is possible because each comparison is independent of each other and may thus be done in parallel. In the general case of P fields, the row address pointer of the address generator is advanced 0,1, . . . , P addresses depending on how many of the compared P frame-rows are to be retained.

The circuit 200 may also be easily adapted for the simpler non-interlace display scheme. The vertical scaling of a non-interlace frame with 16 frame-rows by 11/16 is depicted in FIG 14. The process is very similar to the horizontal scaling process.

In short, a linear image scaling method and system are disclosed which use a bit-reversing process for reducing the number of pixels in an image frame. The bit-reversing process is simple and permits determining whether to discard or retain each frame-row of a frame independently of each other frame-row. This simplifies the pixel reduction step in an interlace display scheme which in turn also simplifies the merge step.

Finally, the invention has been described above with reference to specific embodiments. However, this was only illustrative. Numerous other embodiments may be devised by those having ordinary skill in the art without departing from the spirit and scope of the following claims.

We claim:

1. A process for linearly scaling an image frame organized into sequentially numbered horizontal frame-rows and sequentially numbered vertical frame-columns of pixels, said process comprising the steps of:

producing, in parallel, current and next frame-row numbers, in bit reversed form, from said sequentially numbered horizontal frame-rows, discarding said produced bit reversed current and next frame-rows, independent of each other and independent of other of said sequentially numbered horizontal frame-rows, when said produced current and next frame-rows in bit-reversed form are less than a predetermined number of rows to be discarded from said image frame, retaining said produced current and next frame-rows, independent of each other and independent of other of said sequentially numbered horizontal frame-rows, when said produced current and next frame-rows in bit-reversed form are greater than or equal to said predetermined number of rows to be discarded from said image frame, and merging each retained frame-row into a scaled frame.

2. The process of claim 1 further comprising the step of reversing bits of each frame-row number.

3. The process of claim 1 wherein said merging step further comprises the step of sequentially assigning new frame-row numbers to retained frame-rows.

4. The process of claim 1 wherein said linearly scaling occurs in real-time as said image frame is scanned, wherein said frame-rows are divided into P fields, where each $p^{th}$ field comprises frame-rows p−1, p−1+P, p−1+2P, p−1+3P, . . . , said process further comprising the steps of:

determining whether to retain or to discard each scanned frame-row, and P−1 frame-rows immediately following said scanned frame-row, wherein a frame-row is discarded if said frame-row number, in bit-reversed form, is less than a predetermined number of rows to be discarded from said image frame and a frame-row is retained if said frame-row number, in bit-reversed form, is greater than a predetermined number of rows to be discarded from said image frame, and advancing a row address pointer, which points to a space in a frame buffer for storing one frame-row, a number of row-address spaces equal to a quantity of said frame-rows which are retained.

5. The process of claim 1 further comprising:

discarding frame-columns when a bit reversed frame-column number is less than a predetermined number of columns to be discarded from said image frame, and merging each retained frame-column into said scaled frame.

6. A process for linearly scaling an image frame organized into sequentially numbered horizontal frame rows and sequentially numbered vertical frame-columns of pixels, said process comprising the steps of:

producing, in parallel, current and next frame-column numbers, in bit reversed form, from said sequentially numbered vertical frame-columns of pixels, discarding said produced bit reversed current and next frame-columns, independent of each other and independent of other of said sequentially numbered vertical frame-columns, when said produced current and next frame-columns in bit-reversed form are less than a predetermined number of columns to be discarded from each frame-row of said image frame, retaining said produced current and next frame-columns, independent of each other and independent of other of said sequentially numbered vertical frame-columns, when said produced current and next frame-columns in bit-reversed form are greater than or equal to said predetermined number of columns to be discarded from each frame-row of said image frame, and merging each retained frame-column into a scaled image.

7. A process for vertically scaling an image frame organized into sequentially numbered horizontal frame-rows and sequentially numbered vertical frame-columns of pixels, said process comprising the steps of:

incrementing a frame-row counter by one during the scan of each frame-row, and outputting, in parallel, current and next frame row numbers, reversing, in parallel, the bits of said current and next frame-row numbers outputted by said frame-row counter in a converter circuit to obtain, in parallel, bit-reversed current and next frame-row numbers, comparing said bit-reversed current frame-row number and next frame-row number to a predetermined number of frame-rows to be discarded from said image frame in a comparator circuit in parallel and independent of said next frame-row number and other of said sequentially numbered horizontal frame-rows, if said bit-reversed current frame-row number is greater than or equal to said predetermined number of frame-rows to be discarded from said image frame, storing pixels of a frame-row corresponding to said current frame-row number in a frame buffer at a row address pointed to by a row address pointer independent of said next frame-row number and other of said sequentially numbered horizontal frame-rows, and advancing said row address pointer in an address generator by one, if both said bit-reversed current frame-row number and next frame-row number are greater or equal to said predetermined number of frame-rows, advancing said row address pointer in said address generator by two in a single clock cycle, and merging said stored pixels into a scaled frame.

8. A real-time process for vertically scaling an image frame in a P field interlace display which frame is organized into sequentially numbered horizontal frame-rows and sequentially numbered vertical frame-columns of pixels, said process comprising the steps of:

incrementing, in parallel, a current frame-row counter and P−1 next frame-row counters by one during the scan of each frame-row, reversing, in parallel, the bits of current and next frame-row values outputted by said current and P−1 next frame-row counters in a converter circuit to obtain bit-reversed current and bit-reversed next frame-row values, in a comparator circuit, determining, in parallel, a number of said bit-reversed values of said current frame-row counter and said P−1 next frame-row counters which are greater than or equal to a predetermined number of frame-rows to be discarded from said image frame, independently from each other and from determinations of other frame-row values, if said bit-reversed value of said current frame-row counter is greater than or equal to said predetermined number of frame-rows to be discarded from said image frame, storing the currently scanned frame-row in a frame buffer at a row address pointed to by a row address pointer in an address generator advancing said row address pointer in said address generator by the number of said bit-reversed values of said frame-row counters that are greater than or equal to said predetermined number of frame-rows to be discarded from said image frame using a single clock cycle, repeating said storing step to store said P−1 next frame-rows in said frame buffer at corresponding P−1 row addresses pointed by said row address pointer, and merging said stored current frame-row and said stored P−1 next frame-rows into a scaled frame.

* * * * *